United States Patent
Kaplan et al.

(10) Patent No.: US 7,117,675 B2
(45) Date of Patent: Oct. 10, 2006

(54) COOLING OF LIQUID FUEL COMPONENTS TO ELIMINATE COKING

(75) Inventors: Howard Jay Kaplan, Clifton Park, NY (US); David Francis Acquavella, Buffalo, NY (US); Steven Patrick Junquera, Scotia, NY (US); David Martin Johnson, Simpsonville, SC (US); Christopher David Miller, Clifton Park, NY (US); Robert Joseph Iasillo, Simpsonville, SC (US); Gregory James Hampson, Saratoga Springs, NY (US); Kevin Jon O'Dell, Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/866,817

(22) Filed: Jun. 15, 2004

(65) Prior Publication Data
US 2005/0081525 A1    Apr. 21, 2005

Related U.S. Application Data

(63) Continuation-in-part of application No. 10/308,101, filed on Dec. 3, 2002, now Pat. No. 6,918,255.

(51) Int. Cl.
*F02C 1/00* (2006.01)
*F02G 3/00* (2006.01)

(52) U.S. Cl. ............... 60/734; 60/267; 60/730; 431/160; 239/132.1

(58) Field of Classification Search ........... 60/726, 60/728, 266, 806, 734, 739, 740, 742, 746, 60/747; 431/160; 239/132.1, 132.3
See application file for complete search history.

(56) References Cited

U.S. PATENT DOCUMENTS

| | | | |
|---|---|---|---|
| 2,591,283 A | | 4/1952 | Nesbitt et al. |
| 3,255,966 A | * | 6/1966 | Hoffert et al. ........... 239/132.3 |
| 3,563,683 A | | 2/1971 | Hess |
| 3,623,546 A | | 11/1971 | Banthin et al. |
| 3,685,740 A | | 8/1972 | Shepherd |
| 3,694,168 A | | 9/1972 | Hilgers et al. |
| 3,856,457 A | | 12/1974 | Miller |
| 4,041,697 A | | 8/1977 | Coffinberry et al. |
| 4,054,028 A | * | 10/1977 | Kawaguchi ................ 60/39.23 |
| 4,067,682 A | | 1/1978 | Lado |

(Continued)

*Primary Examiner*—William H. Rodriguez
(74) *Attorney, Agent, or Firm*—Nixon & Vanderhye P.C.

(57) ABSTRACT

A system for cooling at least one gas turbine liquid fuel component located in a high temperature environment to eliminate coking in the component is disclosed. The system includes a sleeve surrounding the liquid fuel component, a device for providing a current of cool air, and a conduit connected between the cool air device and the sleeve to direct the current of cool air into the sleeve to cool the liquid fuel component. The system can also include a manifold connected to the conduit and a plurality of second conduits for connecting the manifold to a plurality of sleeves surrounding a plurality of liquid fuel components, each sleeve being connected to a corresponding second conduit. Each sleeve includes a plurality of spacing devices for centering the sleeve around the at least one liquid fuel component so as to form an annulus between the sleeve and the liquid fuel component through which the current of cool air flows. The system can alternatively use a supply of cool liquid pumped by a pump through a conduit adjacent to a liquid fuel component to cool the component.

41 Claims, 3 Drawing Sheets

U.S. PATENT DOCUMENTS

| | | | |
|---|---|---|---|
| 4,155,702 A | 5/1979 | Miller et al. | |
| 4,353,205 A * | 10/1982 | Cleary | 60/39.12 |
| 4,502,633 A | 3/1985 | Saxon | |
| 4,566,268 A * | 1/1986 | Hoffeins et al. | 60/39.463 |
| 4,600,151 A * | 7/1986 | Bradley | 239/400 |
| 4,666,397 A | 5/1987 | Wenning et al. | |
| 4,858,538 A * | 8/1989 | Kuypers et al. | 110/264 |
| 4,887,800 A * | 12/1989 | Hotta et al. | 266/270 |
| 4,918,923 A | 4/1990 | Woollenweber et al. | |
| 4,928,605 A | 5/1990 | Suwa et al. | |
| 4,946,475 A | 8/1990 | Lipp et al. | |
| 5,000,003 A | 3/1991 | Wicks | |
| 5,097,666 A * | 3/1992 | Shekleton et al. | 60/737 |
| 5,127,346 A | 7/1992 | Kepplinger et al. | |
| 5,149,261 A | 9/1992 | Suwa et al. | |
| 5,261,602 A | 11/1993 | Brent et al. | |
| 5,308,239 A | 5/1994 | Bazarian et al. | |
| 5,393,220 A | 2/1995 | Couwels et al. | |
| 5,408,825 A * | 4/1995 | Foss et al. | 60/39.463 |
| 5,423,178 A * | 6/1995 | Mains | 60/776 |
| 5,467,925 A | 11/1995 | Riano | |
| 5,503,548 A | 4/1996 | Franke et al. | |
| 5,515,794 A | 5/1996 | Kassman et al. | |
| 5,542,841 A | 8/1996 | Nakashima et al. | |
| 5,570,580 A * | 11/1996 | Mains | 60/747 |
| 5,785,721 A | 7/1998 | Brooker | |
| 5,884,471 A * | 3/1999 | Anderson et al. | 60/39.23 |
| 5,899,074 A * | 5/1999 | Komatsu et al. | 60/737 |
| 5,924,275 A * | 7/1999 | Cohen et al. | 60/778 |
| 5,941,459 A * | 8/1999 | Brooker et al. | 239/397.5 |
| 6,003,781 A | 12/1999 | Kwan | |
| 6,073,436 A * | 6/2000 | Bell et al. | 60/39.094 |
| 6,199,368 B1 * | 3/2001 | Onoda et al. | 60/39.463 |
| 6,276,611 B1 * | 8/2001 | Brooker et al. | 239/5 |
| 6,351,948 B1 * | 3/2002 | Goeddeke | 60/740 |
| 6,357,222 B1 * | 3/2002 | Schilling et al. | 60/800 |
| 6,457,316 B1 * | 10/2002 | Czachor et al. | 60/776 |
| 6,595,000 B1 | 7/2003 | Lavie et al. | |
| 6,622,488 B1 * | 9/2003 | Mansour et al. | 60/740 |
| 6,698,207 B1 * | 3/2004 | Wiebe et al. | 30/737 |
| 6,709,777 B1 | 3/2004 | Hagans et al. | |
| 6,786,046 B1 * | 9/2004 | Wiebe et al. | 60/737 |
| 6,837,050 B1 * | 1/2005 | Mandai et al. | 60/725 |
| 6,895,755 B1 * | 5/2005 | Steinthorsson et al. | 60/742 |
| 6,915,636 B1 * | 7/2005 | Stuttaford et al. | 60/737 |
| 6,915,638 B1 * | 7/2005 | Runkle et al. | 60/740 |

* cited by examiner

COOLING OF LIQUID FUEL COMPONENTS TO ELIMINATE COKING

CROSS-REFERENCES TO RELATED APPLICATIONS

This application is a continuation-in-part of application Ser. No. 10/308,101, filed Dec. 3, 2002 now U.S. Pat. No. 6,918,255, the entire content of which is hereby incorporated by reference in this application.

BACKGROUND OF THE INVENTION

The present invention relates to a system for cooling liquid fuel components subject to conduction and radiation heating, and in particular, to a system for directing pressurized ambient temperature air to an annulus located between a component and a sleeve installed around the component or cool liquid to a tube in physical contact with the component.

Gas turbines typically operate on natural gas fuel, with fuel oil (typically No. 2 distillate) often used as a contingency for periods of gas unavailability. When a gas turbine is operating on natural gas fuel, the fuel oil typically remains in liquid fuel lines (e.g., piping/tubing) leading to the combustor nozzles of the gas turbine. The stagnant fuel oil in the liquid fuel lines is often exposed to the turbine compartment air temperatures of up to 250° F., and turbine surfaces of up to 800° F.

Typically, a gas turbine has a number of combustors positioned around the turbine, each combustor having a gas fuel nozzle and a liquid fuel nozzle. When the turbine is running on one type of fuel, the nozzle for the other type of fuel must be purged of the other type of fuel. Thus, for example, when a turbine is switched from running on fuel oil back to running on natural gas fuel, the fuel oil in the liquid fuel nozzle must be purged. Over time, this fuel nozzle "purge air" fills some portion of the liquid fuel piping leading up to the liquid fuel nozzle as the level of fuel oil in the piping recedes due to leakage past upstream shutoff valves, and by thermal expansion and contraction with no make-up supply of liquid fuel. This air-oil interface on the coated surfaces of the piping system and valves (e.g., check valves, ball valves, spool valves, etc.) in the presence of the radiated, conducted, and convected heat, leads to coke formation in the liquid fuel piping, resulting in flow restriction and inoperable valves. Eliminating any one of the three ingredients required for coke formation (i.e., fuel oil, heat and air) will prevent coking. Since it is not practical to eliminate fuel oil or air in a turbine, it would be beneficial to eliminate the heating of the liquid fuel lines, thereby resulting in the prevention of coking in the liquid fuel line piping and valves.

Prior attempts have been made to direct turbine compartment cooling air flow to areas subject to coking, but sufficient temperature cooling could not be attained. Typically, a combustor in a turbine operates at a temperature well over 2000° F. The heat from the combustors radiates toward components, such as the fuel oil piping and valves, sitting in the turbine enclosure. Even with attempts to ventilate the enclosure that included directing cooling air toward components subject to coking, air temperatures of 300° F. around such components was still typical. Lower temperatures could not be attained, even though 30,000 cubic feet per minute of air is typically moving through the enclosure of a turbine.

BRIEF DESCRIPTION OF THE INVENTION

In an exemplary embodiment of the invention, a system for cooling at least one gas turbine liquid fuel component located in a high temperature environment to eliminate coking in the at least one component comprises a sleeve surrounding the at least one liquid fuel component, a device for providing a current of cool air, and a conduit connected between the cool air device and the sleeve to direct the current of cool air into the sleeve to cool the liquid fuel component. The system can further comprise a manifold connected to the conduit and a plurality of second conduits that connect the manifold to a plurality of sleeves surrounding a plurality of liquid fuel components, each sleeve being connected to a corresponding second conduit. The sleeve is comprised of two halves assembled together over the liquid fuel components and a plurality of spacing devices for centering the sleeve around the at least one liquid fuel component so as to form an annulus between the sleeve and the at least one liquid fuel component.

In another exemplary embodiment of the invention, a system for cooling gas turbine liquid fuel components located in a high temperature environment to eliminate coking in the components comprises a blower for providing a current of cool air, a first tube connected to the blower, a manifold connected to the first tube, a plurality of second tubes extending from the manifold, and a plurality of sleeves jacketing the liquid fuel components that are connected to the plurality of second tubes extending from the manifold, each sleeve surrounding at least one liquid fuel component and being connected to a corresponding second conduit. Each sleeve is comprised of at least two halves assembled together over the liquid fuel component and a plurality of spacing devices for centering the sleeve around the liquid fuel component so as to form an annulus between the sleeve and the liquid fuel component.

In yet another exemplary embodiment of the invention, a system for cooling at least one gas turbine liquid fuel component located in a high temperature environment to eliminate coking in the component comprises a blower to draw in external ambient air, a supply header connected to the blower, a supply manifold connected to the supply header, at least one supply tube extending from the manifold, and at least one sleeve jacketing the liquid fuel components. The sleeve includes an annulus located between the sleeve and the fuel oil components through which cooling air flows to reduce the temperature of the fuel oil components.

In a further exemplary embodiment of the invention, a system for cooling at least one gas turbine liquid fuel component located in a high temperature environment to eliminate coking in the at least one component comprises an insulating jacket surrounding the at least one liquid fuel component, a supply of cool liquid, a pump connected to the supply of cool liquid for providing a current of said cool liquid, and a conduit connected to the pump and extending into the jacket wherein the conduit is positioned adjacent to the liquid fuel component to direct the current of cool liquid to cool said component. The system can further comprise a first manifold connected to the conduit and at least one second conduit extending from the manifold and being adjacent to the liquid fuel component. The at least one second conduit can be a plurality of second conduits that are connected to the first manifold and extending adjacent to a plurality of liquid fuel components. It is also possible to have a plurality of second conduits extend and be adjacent to a single liquid fuel component. The system can also further comprise a second manifold connected to the at least one second conduit, at least one third conduit, and a cooling liquid return connected to the at least one third conduit for transferring away a current of liquid absorbing heat from the at least one liquid fuel component.

BRIEF DESCRIPTION OF THE DRAWINGS

The advantages of the present invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
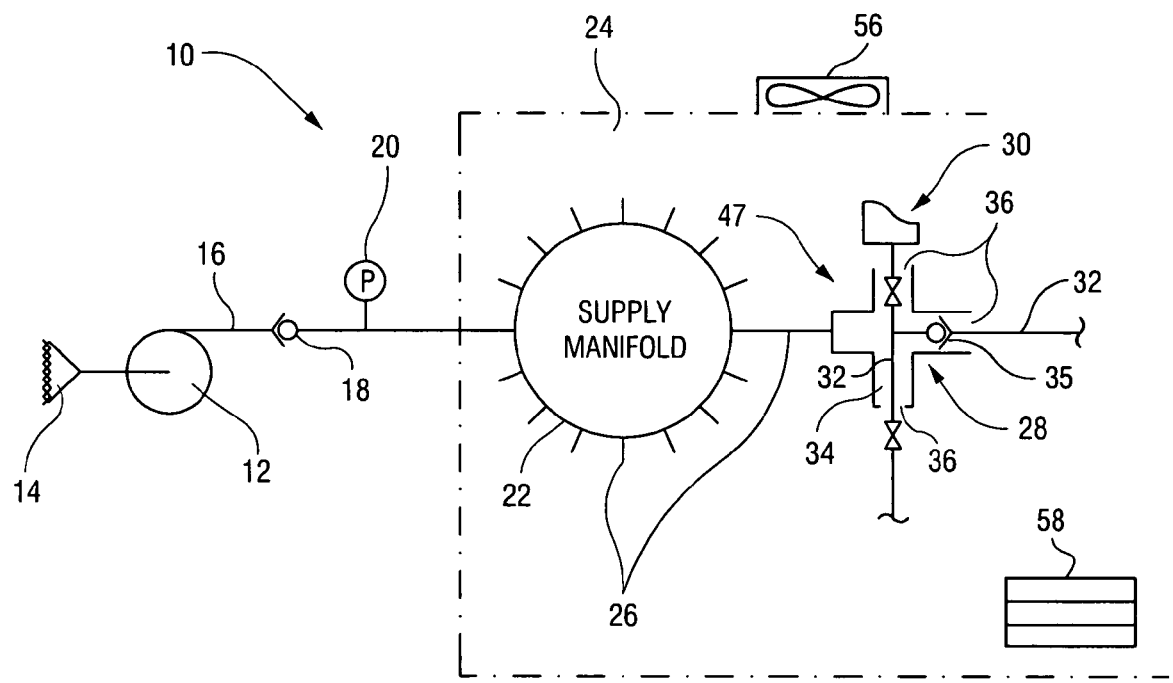
FIG. 1 is a schematic diagram illustrating the components of the air cooling system of the present invention for cooling of liquid fuel components to eliminate coking.

FIG. 1 illustrates an exemplary embodiment of a system, in accordance with the present invention, for eliminating coking by air cooling gas turbine liquid fuel components located in a high temperature environment. The cooling system 10 shown in FIG. 1 uses a high pressure motor driven blower 12 to draw in the required volume of cool ambient air at atmospheric conditions through a screened inlet air silencer 14 and to boost the pressure of such ambient air to overcome system resistance. The pressurized air flows through a first conduit or tube preferably in the form of a supply header 16. A backdraft damper 18 in supply header 16 prevents backflow when system 10 is not operating. A pressure switch 20 signals loss of air flow.

Supply header 16 leads to a supply manifold 22 located within the turbine's enclosure 24. Extending from supply manifold 22 are a plurality of additional or second conduits preferably in the form of a plurality of individual supply tubes 26, one for each combustor 30 contained in the turbine (not shown). Each supply tube 26 feeds a sleeve 28 which surrounds or "jackets" the liquid fuel component, such as liquid fuel tubing 32 and liquid fuel valve 35 for delivering fuel oil to combustor 30, which are prone to coking due to heating. Thus, by way of example, sleeve 28 jackets fuel oil tubing 32 feeding fuel oil to combustor 30. The cooling air fed to sleeve 28 from supply manifold 22 through supply tubing 26 is directed to an annulus 34 between sleeve 28 and tubing 32. The cooling air then exits the open ends 36 of sleeve 28.

Figure 2C:
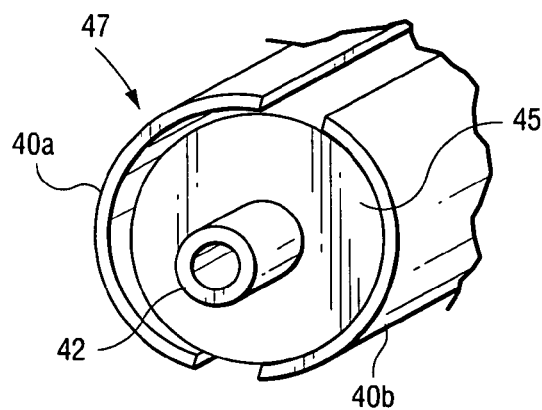
FIG. 2C is a perspective view of the cooling air inlet and corresponding sealing disk used with the air flow control sleeves shown in FIGS. 2A and 2B.
Figure 2A:
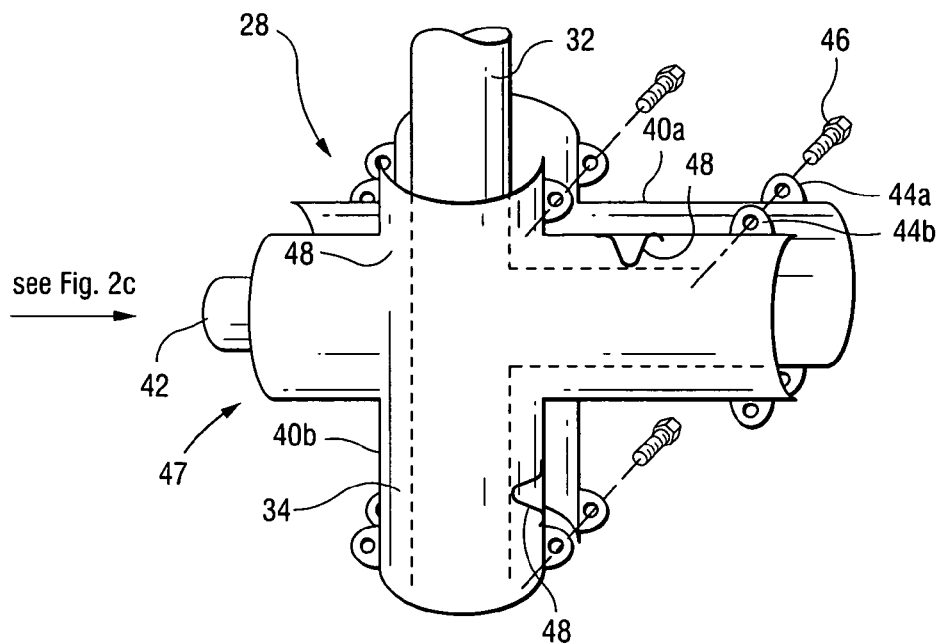
FIG. 2A is perspective view of a first embodiment of an air flow control sleeve used with the air cooling system of the present invention.

FIG. 2a illustrates a first embodiment of the air flow control sleeve 28 used in the air cooling system of the present invention. Sleeve 28 is preferably fabricated from rigid tubing, sized to provide an annulus 34 that allows sufficient cooling air flow to keep the fuel-oil components, such as fuel oil tubing 32, below the temperature at which coke will form. Additionally, sleeve 28 is sized to perform as a radiation shield against heat. Sleeve 28 is preferably made from two halves 40a and 40b, with an axial split line that allows sleeve 28 to be assembled over the fuel-oil components, such as fuel oil tubing 32. In the embodiment shown in FIG. 2a, sleeve 28 halves 40a and 40b are held together by a plurality of clamping tabs 44a and 44b that are held together by a fastener or screw 46 threaded through holes in tabs 44a and 44b. For each sleeve 28, there is a plurality of tab pairs 44a/44b positioned around the sleeve to hold sleeve halves 40a and 40b together at various points.

Sleeve 28 is prevented from physically touching fuel oil tubing 32 by a plurality of springs 48 that are mounted to sleeve 28 and positioned between sleeve 28 and tubing 32. This allows the sizing of annulus 34 to be maintained. A cooling air inlet 42 is fabricated with a disk 45 that is welded or otherwise suitably attached to sleeve 28 half 40a or 40b to direct air into annulus 34. As can be seen in FIG. 2c, air inlet 42 extends through the center of disk 45. The sleeve extension 47 to which air inlet 42 is welded through disk 45 acts as a plenum to increase the flow area into the sleeve 28 proper, otherwise limited by annulus 34. For this purpose, each air inlet connection 42 is connected to a corresponding one of the multiple supply tubes 26 running from supply manifold 22.

Figure 2B:
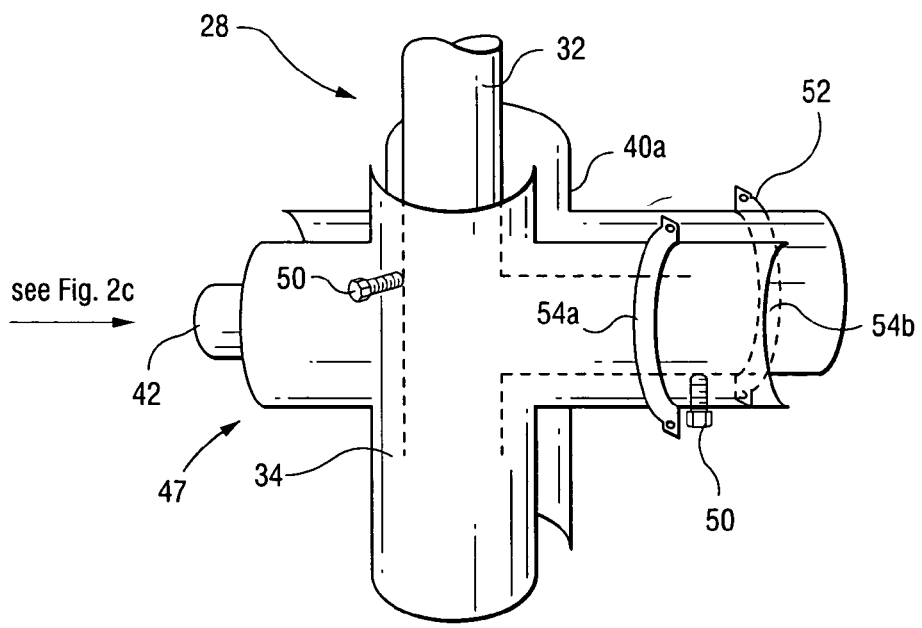
FIG. 2B is a perspective view of a second embodiment of an air flow control sleeve used with the air cooling system of the present invention.

FIG. 2b illustrates an alternative embodiment of the air flow control sleeve 28 used in the present invention. Here again, sleeve 28 is fabricated from rigid tubing made from two halves 42a and 42b sized in a manner identical to that used with respect to sleeve 28 shown in FIG. 2a. Thus, here again, sleeve 28 has an axial split line formed by the joining of sleeve halves 42a and 42b. Sleeve 28 halves 42a and 42b in this embodiment are mechanically clamped together using a clamp 52 that is fabricated from two halves 54a and 54b that are joined together by fasteners or screws 53 when assembled over sleeve 28. In the embodiment of sleeve 28 shown in FIG. 2b, annulus 34 is controlled using set screws 50 to adjust the spacing between sleeve halves 40a and 40b and fuel oil tubing 32. As a particular set screw is rotated into sleeve 28, it engages fuel oil tubing 32, thereby causing sleeve 28 to be pushed away from tubing 32. Conversely, as a set screw 50 is rotated out of sleeve 28, it disengages tubing 32, thereby allowing air flow control sleeve 28 to move closer to tubing 32. In the embodiment of the air flow control sleeve 28 shown in FIG. 2b, there is again a cooling air inlet connection 42 that is fed into sleeve 28 via disk 45 which is again welded to sleeve half 40a or 40b, as shown in FIG. 2c.

Preferably, sleeve 28 is fabricated from stainless steel tubing, although it should be noted that sleeve 28 can be made from any rigid material that can handle the 400° F. temperature typically found in enclosure 24 of a turbine. Alternative materials for fabricating sleeve 28 would include, by way of example, carbon steel (which would likely require cleaning and painting) and aluminum tubing, or molded sheet metal instead of tubing.

The diameter of sleeve 28 is determined by the size of the fuel oil components to be cooled, the size of the annulus 34 required for an effective heat transfer coefficient and a cross-sectional area for annulus 34 consistent with a specified reasonable pressure loss at the desired air flow, all optimized in an iterative process. The maximum dimension of sleeve 28 is further limited by the available space in the congested area of turbine enclosure 24 just upstream of combustor 30.

The air flow through annulus 34 is based on the air heat transfer properties and the maximum expected supply temperature.

The sizing of system piping, such as supply header 16, supply manifold 22 and supply tubing 26 to sleeve 28, as with sleeve 28, is based on pressure loss considerations for blower 12 and its associated motor sizing.

Preferred sizing for a typical air cooling system according to the present invention is a 2" diameter sleeve 28, 1" supply tubing 26, a 4" manifold 22, a 6" header 16, and a 5 horsepower blower motor 12. Except for sleeve 28, all system components can be purchased "off the shelf", with blower 12 sized in a typical system for a minimum of 38 CFM ("cubic feet per minute") per sleeve 28 at a pressure of 40" of water (gauge).

It should be noted that the cooling system of the present invention could be fabricated using liquid cooling rather than air cooling. One type of liquid that would be readily available is water which is used for cooling other components in a gas turbine system. In that case, the sleeving around the fuel oil components to be cooled is an insulation jacket with stainless steel tubing leading up to and being adjacent to the fuel oil components to be cooled. In this embodiment, an outlet manifold is provided for water return back to the source. A water pump, sized for the thermally calculated gallons per minute and the flow calculated pressure loss, provides a current of cool liquid to the tubing adjacent to the fuel oil components.

Figure 3:
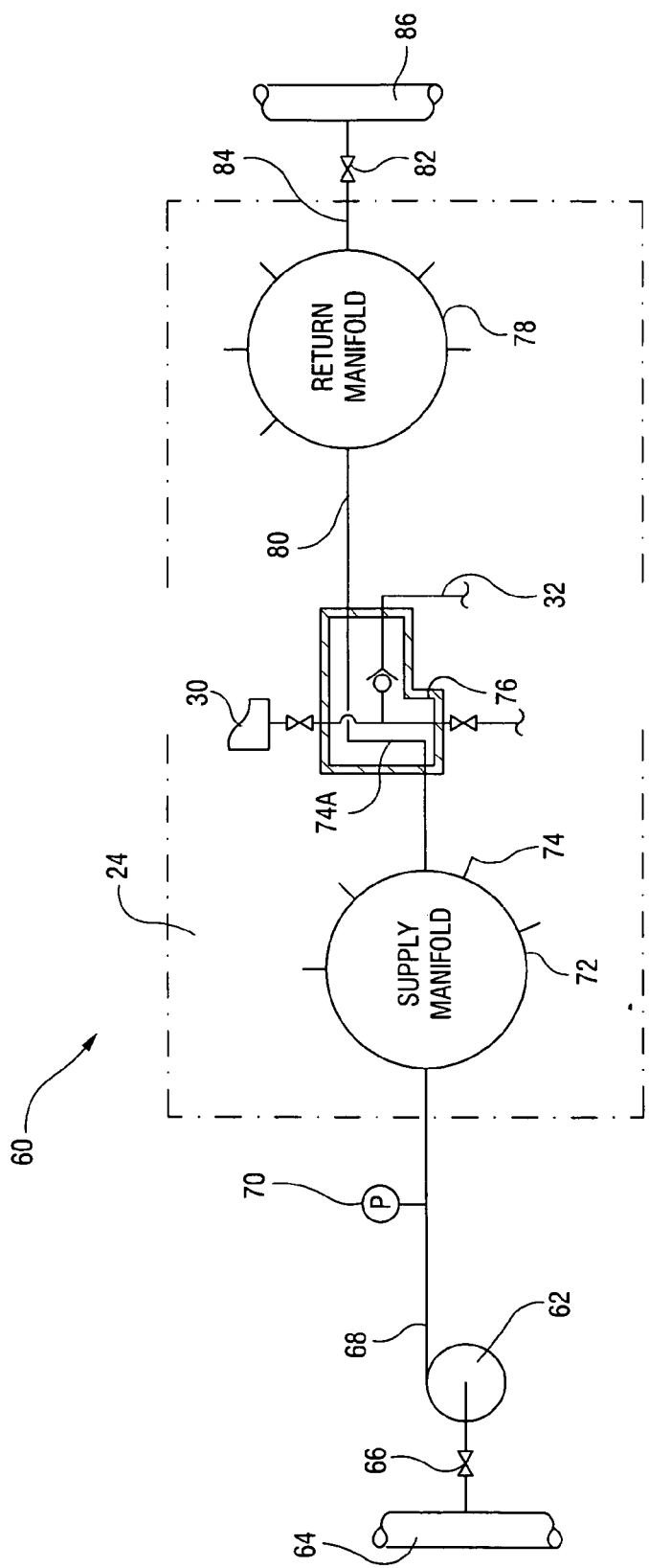
FIG. 3 is a schematic diagram illustrating the components of the liquid cooling system of the present invention for cooling of liquid fuel components to eliminate coking.

FIG. 3 illustrates an alternative embodiment of the present invention which uses liquid cooling to eliminate coking in gas turbine liquid fuel components located in a high temperature environment. The cooling system 60 shown in FIG. 3 uses a pump 62 to draw in the required volume of cool liquid from a cooling water supply 64 through an isolation valve 66 and to boost the pressure of such liquid to overcome system resistance. The pressurized liquid flows through a conduit preferably in the form of a supply header 68. Isolation valves 66 and 82 facilitate system maintenance. A pressure switch 70 signals loss of liquid flow.

Supply header 68 leads to a supply manifold 72 located within the turbine's enclosure 24. Extending from supply manifold 72 are a plurality of additional conduits preferably in the form of a plurality of individual supply tubes 74, one for each combustor 30 contained in the turbine. Each supply tube 74 is routed to a corresponding liquid fuel oil tube 32 feeding a combustor 30 so as to be in physical contact with tube 32. By being in physical contact with tube 32, supply tube 74 absorbs heat from the turbine that may have encroached into tube 32. A thermal insulation jacket 76 surrounds supply tube 32 and supply tube 74 that is adjacent to tube 32. It is also possible to have a plurality of supply tubes 74 extend and be adjacent to a single liquid fuel oil tube 32. Preferably, insulating jacket 76 is formed from a material consisting of fiberglass batts contained in a silicone/fiberglass cloth wrap.

Thus, as seen in FIG. 3, jacket 76 surrounds and insulates fuel oil system tubing 32 feeding fuel oil to combustor 30 and liquid supply tube 74A. The cooling liquid fed to supply tube 74A from supply manifold 72 through supply tubing 74 is thereafter directed to a return manifold 78 which is fed by return tubing 80. The cooling liquid then exits return manifold 78 through return header 84 and isolation valve 82, whereupon it is fed to cooling water return 86 for recycling back to cooling water supply 64 after it has been appropriately cooled.

Referring again to FIG. 1, ventilation for turbine enclosure 24 is typically provided by an exhaust fan 56, which produces a negative pressure within enclosure 24, drawing air through louver vent 58. This ventilation enables sleeve 28 to continue to perform as a radiation shield, even where the component cooling blower 12 fails, because sufficient ambient air is drawn past back draft damper 18 and through annulus 34 to overcome re-radiation from sleeve 28.

While the invention has been described in connection with what is presently considered to be the most practical and preferred embodiment, it is to be understood that the invention is not to be limited to the disclosed embodiment, but on the contrary, it is intended to cover various modifications and equivalent arrangements included within the spirit and scope of the appended claims.

What is claimed is:

1. A system for cooling at least one gas turbine liquid fuel component located in a high temperature environment to eliminate coking in the at least one liquid fuel component for feeding liquid fuel to at least one combustor, the system comprising:
   a sleeve surrounding the at least one liquid fuel component,
   a device for providing a current of cool air, and
   a conduit connected between the cool air device and the sleeve to direct the current of cool air into the sleeve and to the at least one liquid fuel component to cool the liquid fuel component to thereby eliminate coking in said component, the cool air exiting the sleeve without being mixed with the liquid fuel fed to the combustor.

2. The system according to claim 1, wherein the sleeve is formed from a material selected from the group consisting of stainless steel, carbon steel, aluminum tubing, and molded sheet metal.

3. A system for cooling at least one gas turbine liquid fuel component located in a high temperature environment to eliminate coking in the at least one liquid fuel component for feeding liquid fuel to at least one combustor, the system comprising:
   a sleeve surrounding the at least one liquid fuel component,
   a device for providing a current of cool air,
   a conduit connected between the cool air device and the sleeve to direct the current of cool air into the sleeve to cool the liquid fuel component to thereby eliminate coking in said component, the cool air exiting the sleeve without being mixed with the liquid fuel fed to the combustor, and
   a manifold connected to the conduit and at least one second conduit connecting the manifold to the sleeve.

4. The system according to claim 3 wherein a plurality of second conduits connect the manifold to a plurality of sleeves surrounding a plurality of liquid fuel components, each sleeve being connected to a corresponding second conduit.

5. The system according to claim 3, wherein the second conduit is attached to a disk that is part of sleeve.

6. A system for cooling at least one gas turbine liquid fuel component located in a high temperature environment to eliminate coking in the at least one liquid fuel component for feeding liquid fuel to at least one combustor, the system comprising:
   a sleeve surrounding the at least one liquid fuel component,
   a device for providing a current of cool air, and
   a conduit connected between the cool air device and the sleeve to direct the current of cool air into the sleeve to cool the liquid fuel component to thereby eliminate coking in said component, the cool air exiting the sleeve without being mixed with the liquid fuel fed to the combustor,
   the sleeve being comprised of a plurality of spacing devices for centering the sleeve around the at least one liquid fuel component so as to form an annulus between the sleeve and the at least one liquid fuel component.

7. The system according to claim 6, wherein each spacing device is a spring positioned between the sleeve and the at least one liquid fuel component.

8. The system according to claim 6, wherein each spacing device is a set screw extending between the sleeve and the at least one liquid fuel component.

9. The system according to claim 6 wherein the sleeve has a size that is determined by the size of the liquid fuel components to be cooled, the size of the annulus required for an effective heat transfer coefficient and a cross-sectional area for the annulus consistent with a specified pressure loss in the current of cool air.

10. A system for cooling at least one gas turbine liquid fuel component located in a high temperature environment to eliminate coking in the at least one liquid fuel component for feeding liquid fuel to at least one combustor, the system comprising: a
sleeve surrounding the at least one liquid fuel component,
a device for providing a current of cool air, and
a conduit connected between the cool air device and the sleeve to direct the current of cool air into the sleeve to cool the liquid fuel component to thereby eliminate coking in said component, the cool air exiting the sleeve without being mixed with the liquid fuel fed to the combustor,
the sleeve being comprised of two halves assembled together over the at least one liquid fuel component.

11. The system according to claim 10, wherein the two halves of the sleeve are joined together by a plurality of tabs protruding from the sleeve halves and joined together by a fastener extending through the tabs.

12. The system according to claim 10, wherein the two halves of the sleeve are joined together by a plurality of clamps positioned over the sleeve halves.

13. The system according to claim 12, wherein each clamp is comprised of two halves joined together by at least one fastener extending through the clamp halves.

14. The system according to claim 10, wherein the second conduit is attached to an air inlet that is positioned in a disk that is welded to one of the two halves forming the sleeve.

15. A system for cooling gas turbine liquid fuel components located in a high temperature environment to eliminate coking in the liquid fuel components comprising:
a blower for providing a current of cool air;
a first tube connected to the blower;
a manifold connected to the first tube;
a plurality of second tubes extending from the manifold; and
a plurality of sleeves jacketing the liquid fuel components and being connected to the plurality of second tubes extending from the manifold, each sleeve surrounding at least one liquid fuel component and being connected to a corresponding second tube to receive the current of cool air for cooling the liquid fuel component to thereby eliminate coking in said component, the cool air exiting the sleeve without being mixed with liquid fuel exiting said component.

16. The system according to claim 15 wherein each sleeve is comprised of a plurality of spacing devices for centering the sleeve around the liquid fuel components so as to form an annulus between the sleeve and the liquid fuel components through which the current of cool air flows to cool the liquid fuel component.

17. The system according to claim 16, wherein each spacing device is a spring positioned between the sleeve and the at least one liquid fuel component.

18. The system according to claim 16, wherein each spacing device is a set screw extending between the sleeve and the at least one liquid fuel component.

19. The system according to claim 16, wherein the sleeve has a size that is determined by the size of the liquid fuel components to be cooled, the size of the annulus required for an effective heat transfer coefficient and a cross-sectional area for the annulus consistent with a specified pressure loss in the current of cool air.

20. The system according to claim 16 further comprising an exhaust fan and a vent for producing a negative pressure within the turbine's enclosure, wherein a reduced current of cool air continues to flow through the annulus upon blower failure, enabling the sleeve to function as a radiation shield.

21. The system according to claim 15, wherein the sleeve is comprised of two halves assembled together over the liquid fuel components.

22. The system according to claim 21, wherein the two halves of the sleeve are joined together by a plurality of tabs protruding from the sleeve halves and joined together by a fastener extending through the tabs.

23. The system according to claim 21, wherein the two halves of the sleeve are joined together by a plurality of clamps positioned over the sleeve halves.

24. The system according to claim 23, wherein each clamp is comprised of two halves joined together by at least one fastener extending through the clamp halves.

25. The system according to claim 21, wherein each second tube is attached to a disk that is inserted between the two halves of the sleeve.

26. The system according to claim 15, wherein the sleeve is formed from a material selected from the group consisting of stainless steel, carbon steel, aluminum tubing, and molded sheet metal.

27. A system for cooling at least one gas turbine fuel oil component located in a high temperature environment to eliminate coking in the at least one fuel oil component comprising:
a blower to draw in a current of cool ambient air;
a supply header connected to the blower;
a supply manifold connected to the supply header;
at least one supply tube extending from the manifold; and
at least one sleeve jacketing surrounding the at least one fuel oil component and being connected to the at least one supply tube to receive and direct the current of cool air to cool the fuel oil component to thereby eliminate coking in said component, to thereby eliminate coking in said component, the cool air exiting the sleeve without being mixed with liquid fuel exiting said component.

28. The system according to claim 27 further comprising a damper in the header to prevent backflow when the system is not operating.

29. The system according to claim 27, wherein a plurality of individual supply tubes extend from the supply manifold.

30. The system according to claim 27, wherein a plurality of sleeves jacket a plurality of fuel oil components.

31. The system according to claim 27, wherein the sleeve includes an annulus located between the sleeve and the fuel oil component through which cooling air flows to reduce the temperature of the at least one fuel oil component.

32. The system according to claim 31 further comprising an exhaust fan for producing a negative pressure within the turbine's enclosure, wherein a reduced current of cool air continues to flow through the annulus upon blower failure, enabling the sleeve to function as a radiation shield.

33. The system according to claim 32 further comprising a vent through which exhaust fan draws air into enclosure.

34. The system according to claim 27, wherein each sleeve is comprised of two halves assembled together over the at least one fuel oil component.

35. The system according to claim 34, wherein the two halves of the sleeve are joined together by tabs protruding from the sleeve halves that are joined together by screws extending through the tabs.

36. The system according to claim 34, wherein a plurality of sleeves jacket a plurality of fuel oil components including fuel piping and valves.

37. The system according to claim 27, wherein the sleeve is formed from a material selected from the group consisting of stainless steel, carbon steel, aluminum tubing, and molded sheet metal.

38. A system for cooling at least one gas turbine liquid fuel component located in a high temperature environment to eliminate coking in the at least one liquid fuel component comprising:
   means for providing a current of cool air, and
   means surrounding the at least one liquid fuel component to direct the current of cool air to the liquid fuel component to cool the liquid fuel component,
   means connected between the providing means and the surrounding means for transferring the current of cool air into the surrounding means to cool the liquid fuel component to thereby eliminate coking in said component, the cool air exiting the sleeve without being mixed with liquid fuel exiting said component.

39. The system according to claim 38 further comprising a plurality of surrounding means to direct the current of cool air to a plurality of liquid fuel components to cool the liquid fuel components and a plurality of transferring means connected between the providing means and the plurality of surrounding means for transferring the current of cool air into the plurality of surrounding means.

40. A system for cooling at least one gas turbine liquid fuel component located in a high temperature environment to eliminate coking in the at least one liquid fuel component feeding at least one combustor the system comprising:
   a sleeve surrounding the at least one liquid fuel component,
   a device for providing a current of cool air,
   a conduit connected between the cool air device and the sleeve to direct the current of cool air into the sleeve to cool the liquid fuel component and,
   an exhaust fan for producing a negative pressure within the turbine's enclosure , wherein a reduced current of cool air continues to flow through the sleeve upon a failure of the cool air providing device, enabling the sleeve to function as a radiation shield.

41. The system according to claim 40 further comprising a vent through which exhaust fan draws air into enclosure.

* * * * *